July 16, 1957  G. A. LYON  2,799,537
WHEEL STRUCTURE
Filed Nov. 21, 1952  2 Sheets-Sheet 2
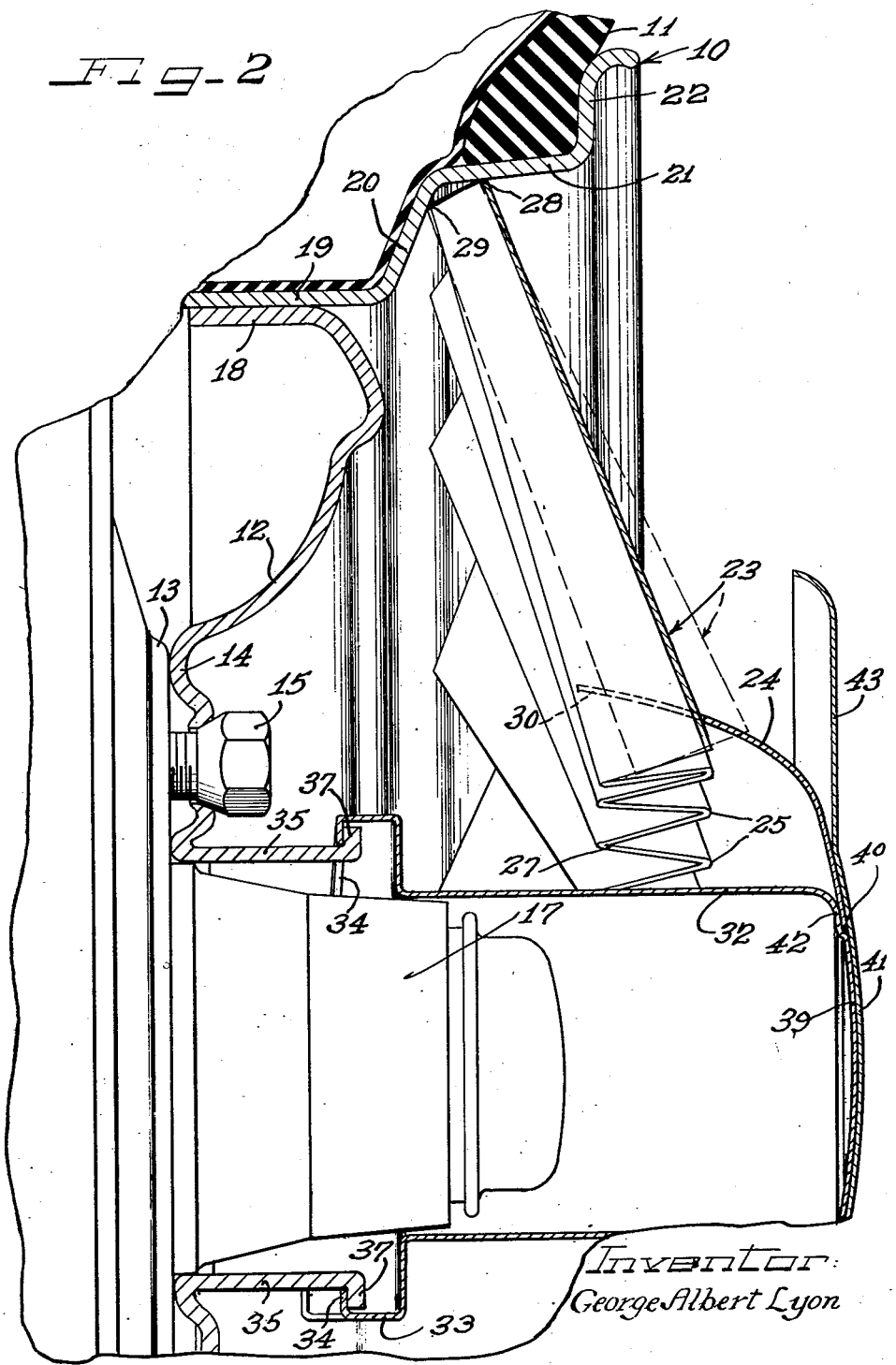
Inventor:
George Albert Lyon United States Patent Office 2,799,537
Patented July 16, 1957

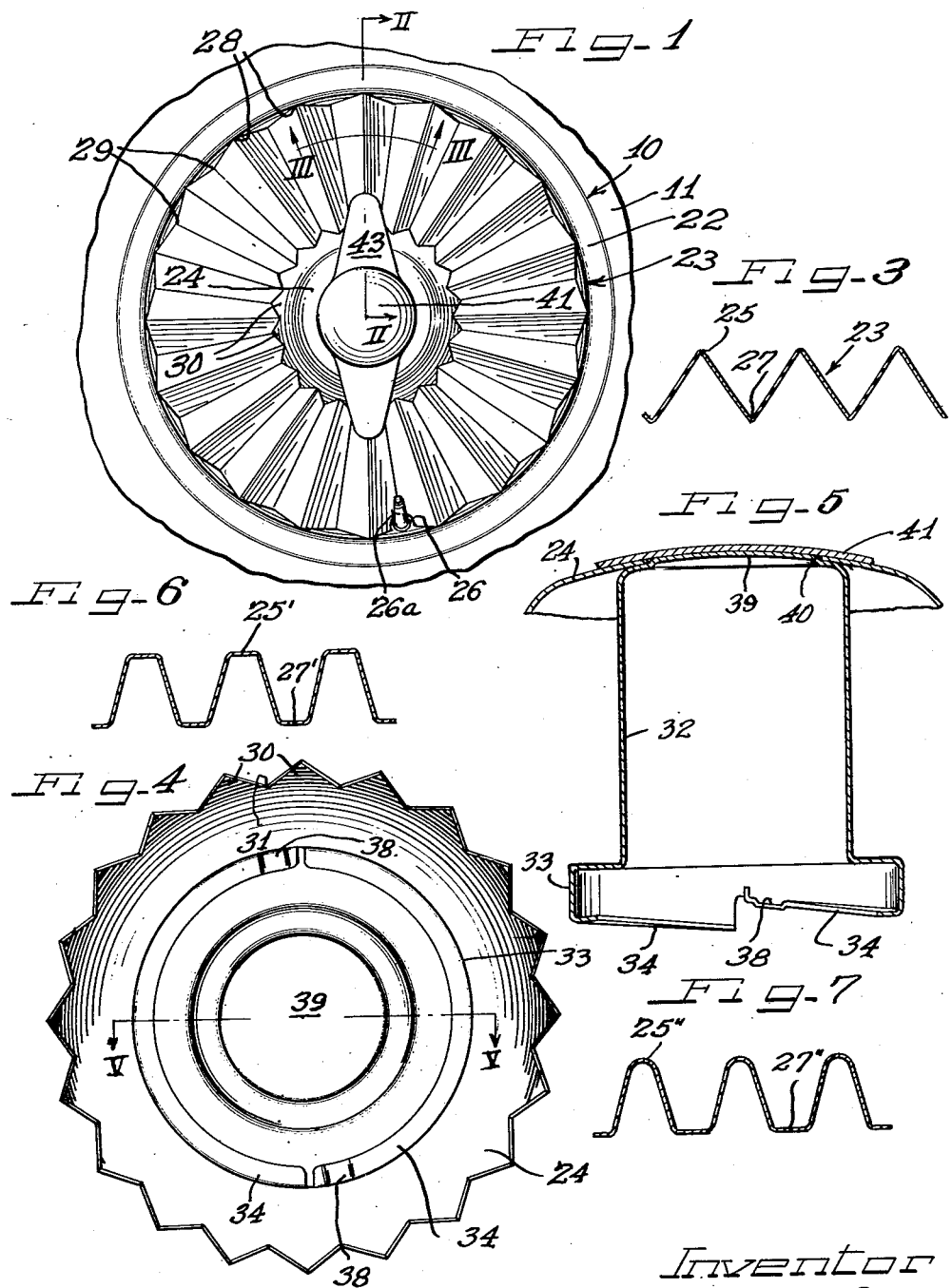

2,799,537

WHEEL STRUCTURE

George Albert Lyon, Detroit, Mich.

Application November 21, 1952, Serial No. 321,849

14 Claims. (Cl. 301—37)

The present invention relates to improvements in wheel structures and more particularly concerns the ornamental and protective covering of the outer sides of vehicle wheels.

An important object of the present invention is to provide a vehicle wheel structure having improved ornamental and protective covering means at the outer side thereof.

Another object of the invention is to provide a novel cooperative relationship between a vehicle wheel and a cover for the outer side thereof.

A further object of the invention is to provide an improved vehicle wheel cover.

Still another object of the invention is to provide a vehicle wheel cover of simple construction and attractive appearance which can be produced economically at low cost by mass production methods of manufacture.

Yet another object of the invention is to provide an improved vehicle wheel cover that can be easily applied or removed with respect to the outer side of a vehicle wheel and when in assembly with the wheel is held under effective tension, vibration free and turn free relationship on the wheel.

It is also an object of the present invention to provide a vehicle wheel cover which lends itself readily to various ornamental effects, and more especially generally spoke-like simulations.

Other objects, features and advantages of the present invention will be readily apparent from the following detailed description of certain preferred embodiments thereof taken in conjunction with the accompanying drawings, in which:

Figure 1 is a side elevational view of a vehicle wheel structure having a cover thereon within the purview of the present invention;

Figure 2 is an enlarged fragmentary radial sectional view taken substantially on the line II—II of Figure 1;

Figure 3 is an enlarged fragmentary detail sectional view taken substantially on the line III—III of Figure 1;

Figure 4 is a rear elevational view of the central retaining and tensioning cap member of the cover assembly;

Figure 5 is a diametrical sectional view taken substantially on the line V—V of Figure 4;

Figure 6 is a fragmentary sectional view similar to Figure 3 but showing a modified construction; and Figure 7 is a fragmentary sectional view similar to Figures 3 and 6 but showing still another modification.

The present invention is especially useful in connection with a vehicle wheel having a multi-flange tire rim 10 adapted to support a pneumatic tire and tube assembly 11 and carried by a wheel body 12 which is adapted to be secured to an axle hub flange 13 of a vehicle wheel axle structure. The wheel body 12 is preferably of the disk spider type pressed from suitable heavy gauge sheet metal and is formed with a central dished bolt-on flange 14 which in assembly with the vehicle axle is secured to the hub flange 13 by means of attachment bolts 15, the shanks of which extend through appropriate apertures on the bolt-on flange. To accommodate a central hub projection 17, the bolt-on flange 14 is centrally apertured.

At its outer margin the wheel body 12 is provided with an axially inwardly directed attachment flange 18 secured in an appropriate manner to a base flange 19 of the tire rim 10. At its outer side the tire rim includes a side flange 20 which angles radially and axially outwardly from the base flange and merges with a generally axially outwardly and slightly radially outwardly sloping intermediate flange 21 in turn merging with a terminal flange 22.

Substantially covering the outer side of the wheel is a protective and ornamental cover which comprises an annular cover member 23 dimensioned to extend in concealing relation across the wheel body 12 and at least a portion of the outer side of the tire rim 10 and retained in place in assembly with the wheel by a central closure and retaining cap member 24.

The construction of the cover member 23 is such that it can be easily and freely applied to the outer side of the wheel and then placed under resilient compression or tension in retained relation on the wheel. To this end, the cover member 23 is made from resilient sheet metal such as stainless steel or brass having substantial resiliency. As best seen in Figures 1, 2 and 3. The annular body of the member 23 is formed along uniform radial lines into a series of uniform corrugations which may be of substantially accordion pleat structure as shown. The radial corrugations provide axially outwardly projecting radially extending ridges 25 and axially inwardly directed but axially outwardly opening furrows or valleys 27 alternating with the ridges. As will be observed, the ridges are narrower at their roots at the radially inner portion of the cover member 23 than at the radially outer margin of the cover member while the furrows 27 are narrowest at the radially inner margin of the cover member and wider at the radially outer margin of the cover member. This provides a generally frustoconical shape to the cover member 23 sloping radially outwardly and axially inwardly from the inner margin. At the same time, the several radially elongated side panels defining the several ridges 25 and valleys 27 are relatively movable resiliently along the crease lines defining the peaks of the ridges and the bottoms of the furrows so that the body member 23 is resiliently flexible uniformly responsive to pressure applied axially inwardly against the inner margin of the cover member, as enabled by collapsing or expansion movement of the several panels, accordion pleat-like. Furthermore, it will be appreciated that along radial lines defined by the peaks and valleys and more particularly at the crease lines, the cover member 23 is quite stiff to resist radial thrusts as well as axial pressures tending to deform the face of the member 23 from the uniform corrugated pattern.

The outer peripheral diameter of the cover member 23 is preferably slightly less than at least the outer marginal inner face diameter of the intermediate flange 21 of the tire rim. Thereby, in mounting the cover member 23 on the wheel, the cover member 23 is placed in centered position on the wheel with corner radially outwardly directed points 28 at the outer ends of the ridge creases 25 opposing the intermediate flange 21 of the tire rim and with axially inwardly and radially inwardly directed and radially inwardly inset corner points 29 at the radially outer ends of the valley creases 27 opposing the side flange 20 of the tire rim. A notch 26 is provided in the outer margin of the cover preferably within one of the valleys 27 to clear a valve stem 26a (Figure 1). When thus placed, the cover member 23 will be in the untensioned position indicated in dash outline in Figure 2.

As a final step in mounting and attaching the cover member 23 to the wheel, the central cap member 24 is applied to the inner margin of the cover member 23 and pressed axially inwardly and attached to the wheel body 12. To this end the cap member is provided as a substantially cup-shaped structure having a diameter somewhat greater than the inner diameter of the cover member 23 and provided with a marginal configuration complementary to the configuration of the outer side of the engaged margin of the member 23. As shown, the margin of the member 24 is for this purpose of generally serrated or notched-out form providing a uniform series of generally wedge-shaped finger-like projections 30 alternating with generally V-shaped cutouts 31, the projections 30 fitting into the valleys 27 and the cutouts 31 receiving the ridges 25 of the margin of the cover member 23. The dimensions of the projections 30 and the notches 31 are such that when the cover member 23 is pressed in from the dash position of Figure 2 to the full line position of Figure 2, the edges defining the projections 30 will engage reasonably snugly against the sides of the ridges 25 from the ridge creases thereof to the valley creases 27.

Attachment of the member 24 to the wheel in compressing, tensioning relation to the cover member 23 is effected by means such as a tubular, preferably cup-shaped cylindrical hub member 32 opening axially inwardly and dimensioned to receive freely the outer end portion of the wheel hub 17. The inner end portion of the hub member 32 is provided with an enlarged diameter portion 33 formed with diametrically opposite complementary diagonal cam flanges 34 extending radially inwardly and engageable retainingly with retaining means on the bolt-on flange 14 of the wheel body. For this purpose the bolt-on flange 14 is provided with axially outward retaining lug extensions 35 having radially outwardly directed retaining flanges 37 which are engageable with the retaining cam flanges 34 of the hub member. This is effected by moving the hub member 32 axially inwardly until the axially innermost ends of the respective cam flanges 34 are alongside the retaining flanges 37, and then by turning the hub member 32 clockwise, the cam flanges 34 engaging behind the flanges 37 draw the hub member 32 progressively axially inwardly until the flanges 37 snap into detent recesses 38 provided at the inner end portions of the flanges 34.

In order to enable turning of the retaining hub member 32 relative to the cap member 24, the hub member 32 is provided with a central offset embossment 39 which extends through a central clearance aperture 40 in the member 24 and is attached as by means of spot welding or the like to a handle member 41 between which and a shoulder 42 of the hub member 32 the margin defining the central aperture 40 of the member 24 is slidably retained. The handle member 41 has lateral handle extensions 43 which are adapted to be manually engaged for turning the hub member 32 through the medium of the handle member 41.

In attaching the cover to the wheel, after the cover member 23 has been placed in position relative to the tire rim 10, the cap member 24 is pressed against the inner margin of the member 23 and the hub member 32 engaged with the retaining lugs 35. Turning of the handle 43 causes the hub member 32 to be drawn axially inwardly by action of the cam flange 34 and the retaining flanges 37, and the cap member 24 is thus drawn in correspondingly and applies compression, tensioning pressure against the inner margin of the member 23 to flex the inner margin from the dash line position of Figure 2 to the full line position of Figure 2. As this occurs, the points 29 at the outer margin of the cover member 23 slide radially outwardly on the side flange 20 and the points 28 slide axially outwardly on the intermediate flange 21 and are gradually placed under biting radial thrusting engagement with the tire rim intermediate flange to retain the cover member 23 against turning on the wheel under the influence of torque forces during service running of the wheel. At the same time, the substantial tension under which the cover member 23 is held assures freedom from rattling.

Removal of the cover from the wheel is, of course, easily effected by turning the handle member 43 in reverse, that is, counterclockwise, to release the retaining flanges 34 from the lug flanges 37 and thereby relieve the cover member 23 from the tensioned engagement of the retaining and closure cap member 24. Hence the cover member 23 can spring out to the dash line position of Figure 2, and springs free from the tire rim 10 so that the cover can be lifted away from the wheel.

For ornamental variation from the zig zag or accordion pleat form of the cover member 23 as best visualized in Figure 3, the cross-sectional configuration of the ribs and valleys may be modified as for example in Figures 6 or 7. In Figure 6 ridges 25' provided with flattened crests while valleys 27' are provided with corresponding flattened roots. In the modification of Figure 7 ridges having arcuate crests 25" alternated with valleys 27" having flattened roots. The flat root furrows or root configurations of the corrugations lend themselves especially well to painting the roots black so that the outer side appearance of the cover member will generally simulate spokes provided by the ridges alternating with what appear to be voids. In any event, operation of the cover member and coaction of the cover member with the wheel will be as described in connection with the cover member 23 of Figures 1, 2 and 3.

It will be understood that modifications and variations may be effected without departing from the scope of the novel concepts of the present invention.

I claim as my invention:

1. In a wheel structure including a wheel body and a tire rim, a cover for disposition at the outer side of the wheel comprising an annular cover member provided with radial corrugations having the radially outer ends thereof engaging endwise against a generally radially inwardly facing flange of the tire rim, and means engaging the inner portion of said annular cover member and connected to the wheel body and maintaining the annular cover member under axially inward compression for thrusting under radially outward tension against the tire rim.

2. In a wheel structure including a wheel body and a tire rim, a cover for disposition at the outer side of the wheel comprising an annular cover member provided with radial corrugations having the radially outer ends thereof engaging endwise against a generally radially inwardly facing flange of the tire rim, and means engaging the inner portion of said annular cover member and connected to the wheel body and maintaining the annular cover member under axially inward compression for thrusting under radially outward tension against the tire rim, said corrugations providing a uniform series of radially outward sharp projections at the outer margin of the cover member retainingly engage the tire rim to hold the cover member against turning on the wheel.

3. In a wheel structure including a wheel body and a multi-flange tire rim, a cover member for disposition at the outer side of the wheel including a body portion having a uniform series of radially extending but circumferentially relatively expansible and contractable corrugations and engaging a flange of the tire rim at the outer ends of the corrugations, and means at the center of the cover member securing the same under tension against the wheel by circumferentially contracting the corrugations.

4. In a wheel structure including a wheel body and a multi-flange tire rim, a cover member for disposition at the outer side of the wheel including a body portion having a uniform series of radial corrugations and engaging a flange of the tire rim at the outer ends of the corrugations, and means at the center of the cover member securing the same under tension against the wheel, said means comprising a cap member having a margin providing an edge with fingers complementary to the corrugated inner portion of the outer side of said cover member and internested with said inner portion of the cover member.

5. In a wheel structure including a wheel body and a multi-flange tire rim, a cover member for disposition at the outer side of the wheel including a body portion having a uniform series of radial corrugations and engaging a flange of the tire rim at the outer ends of the corrugations, and means at the center of the cover member securing the same under tension against the wheel, said means comprising a cap member having a margin providing an edge with fingers complementary to the corrugated inner portion of the outer side of said cover member and internested with said inner portion of the cover member in relatively non-rotary relation, said cap member having a retaining member projecting axially inwardly therefrom and rotatable relative thereto for engaging a portion on the wheel body.

6. In a cover for disposition at the outer side of a vehicle wheel, a resiliently flexible cover body having uniform series of radial corrugations which are narrower at the inner portion of the cover than at the outer margin of the cover so that the cover is of generally frustoconical form, said corrugations being substantially rigid radially but relatively expansible and contractable circumferentially.

7. In a cover for disposition at the outer side of a vehicle wheel, a resiliently flexible cover body having uniform series of radial corrugations which are narrower at the inner portion of the cover than at the outer margin of the cover so that the cover is of generally frustoconical form, said cover being centrally apertured and the corrugations being flexibly related circumferentially substantially accordion fashion so that the cover can be put under flexible tension by compression force supplied axially to the central portion of the cover.

8. In a cover assembly for disposition at the outer side of a vehicle wheel, a radially corrugated annular cover member, a central closure cap and retaining member having a margin providing a generally axially extending edge with finger-like projections generally complementary to and internestingly interengageable in closing relation with the corrugations at the outer side of the inner margin of said annular cover member, and means carried by said cap member for attaching the assembly to a wheel.

9. In a cover assembly for disposition at the outer side of a vehicle wheel, a radially corrugated annular cover member, a central closure cap and retaining member having a margin providing a generally axially extending edge with finger-like projections generally complementary to and internestingly interengageable in closing relation with the corrugations at the outer side of the inner margin of said annular cover member, and means carried by said cap member for attaching the assembly to a wheel, said means comprising a central hub member projecting axially inwardly and an outer handle member attached thereto and rotatable relative to the cap member.

10. In a cover for disposition at the outer side of a vehicle wheel, an annular flexible cover member of generally frustoconical shape and having a uniform series of radially extending corrugations which are of wider spacing at the outer margin of the cover member than at the inner margin of the cover member, said corrugations having outer end portions engageable with a wheel, said corrugations being of accordion pleat cross-section and resilient action.

11. In a wheel structure including tire rim and body parts, a cover assembly for disposition at the outer side of the wheel having a generally annular cover member for overlying the tire rim and an adjacent portion of the wheel body, and a central cover member for overlying the wheel body, with the adjacent marginal portions of the cover members overlapping and provided with projection and socket means connecting the members together against relative rotation, said socket means comprising longitudinal corrugations in said annular cover member running out to the radially outer edge of said annular cover member and providing end points engageable generally bitingly with a radially facing annular surface of the tire rim.

12. In a wheel structure including a tire rim and a wheel body, having cover retaining means thereon, a cover assembly for disposition at the outer side of the wheel provided with a generally annular cover member for concealingly overlying the tire rim and an adjacent portion of the wheel body and having a central opening, and a central cover structure including a member for overlying the inner margin of said annular cover member about said opening and a retaining member relatively rotatably connected to said overlying member and having means engageable with said cover retaining means as enabled by said central opening by rotary interengagement movement of the relatively rotatable retaining member, the inner margin of said annular cover member and said overlying member being provided with projection and socket means connecting such members together against relative rotation when said relatively rotatable member is rotated as aforesaid.

13. In a wheel structure including a radially facing annular surface and axially inwardly related thereto a generally axially outwardly facing surface, a generally circular wheel cover member which is both axially and radially resiliently deflectable and is engageable with said axially facing surface for radially sliding movement and has generally radially projecting portions thereon normally disposed on a diameter for clearing said annular surface closely so as to enable relative axial assembly or disassembly of the cover member relative to the wheel, with the cover member extending generally axially outwardly and radially from engagement with the axially facing surface, and an axial pressure applying cover member engageable with said resiliently deflectable cover member remote from said axially facing surface and having means for engagement with the wheel to effect an assembled relationship thereof with the wheel and for pressing generally axially inwardly against the resiliently deflectable cover member to maintain the same in assembly under axial deflection resulting in radial sliding thereof on said axially facing surface to thereby radially deflect said projecting portions into thrusting engagement with said radially facing surface.

14. In a wheel structure including a wheel body and a tire rim supported thereby with means on the wheel body for retaining engagement by a cover member in response to rotary movement of the cover member, a cover assembly for disposition at the outer side of the wheel including an annular cover member engageable with the tire rim and having an inner flexible portion for overlying the wheel body, said annular cover member having a central aperture for disposition therethrough of a rotary member retainingly engageable with the retaining means on the wheel body in response to rotary movements of said rotary member, a handle on said rotary member, and a central cover member carried by said rotary member and disposed axially inwardly from said handle in relatively rotatable relation about said rotary member and arranged to be moved axially inwardly by pressure applied thereto incident to rotary engagement of said rotary member with said retaining means, said central cover member and the inner flexible portion of said annular cover member having separably interengageable generally axially extending interlock projection means thereon by which the central cover member and the annular cover member are maintained in relatively non-rotatable relation but permitting rotation relative thereto of said rotary member and said handle for applying or disengaging the cover assembly with respect to the wheel and whereby said annular cover member is enabled to remain in stationary relation upon the tire rim for maintaining registration of a valve stem through an aperture therein although the rotary member and handle are turned as aforesaid.

References Cited in the file of this patent

UNITED STATES PATENTS

| | | |
|---|---|---|
| D. 168,313 | Lyon | Dec. 2, 1952 |
| 2,124,789 | Lyon | July 26, 1938 |
| 2,159,881 | Booth | May 23, 1939 |
| 2,368,238 | Lyon | Jan. 30, 1945 |
| 2,633,944 | Butterfield | Apr. 7, 1953 |

FOREIGN PATENTS

| | | |
|---|---|---|
| 526,576 | Great Britain | Sept. 20, 1940 |